Patented Oct. 9, 1923.

1,470,555

UNITED STATES PATENT OFFICE.

AUGUSTUS EDWARD CRAVER, OF BUFFALO, NEW YORK, ASSIGNOR TO THE BARRETT COMPANY, A CORPORATION OF NEW JERSEY.

DYESTUFF PREPARED FROM ORTHOXYLYLALDEHYDE.

No Drawing. Application filed October 30, 1922. Serial No. 598,022.

*To all whom it may concern:*

Be it known that I, AUGUSTUS E. CRAVER, a citizen of the United States, residing at Buffalo, in the county of Erie and State of New York, have invented certain new and useful Improvements in Dyestuffs Prepared from Orthoxylylaldehyde, of which the following is a specification.

It is well known that the condensation of benzaldehyde or derivatives thereof with aromatic secondary or tertiary amines or derivatives thereof yield in many cases leuco compounds or valuable dyestuffs of the triphenylmethane series, the properties of which dyestuffs depend upon the composition and constitution of the intermediates used.

The present invention is based on the discovery that new and valuable dyestuffs can be obtained from ortho-xylylaldehyde (3:4—dimethylbenzaldehyde) by condensing it with aromatic secondary or tertiary amines and subsequently oxidizing the leuco compound thus produced. These new triphenylmethane dyestuffs are of particular value for dyeing mordanted cotton and unmordanted silk, and occasionally for dyeing mordanted silk, and mordanted and unmordanted wool, and other vegetable and animal fibers.

The dyed fabrics or other material dyed with these new dyestuffs also form part of the present invention.

The new dyestuffs can be obtained by oxidation in acid solution of leuco bases of the triphenylmethane series having the following general formula:

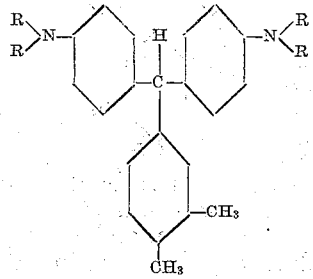

wherein R denotes hydrogen, alkyl, aryl, aralkyl or alkaryl groups which may or may not be substituted (e. g., $-CH_3$, $-C_6H_5$, $-C_2H_5$, $-C_6H_4CH_3$, $-CH_2C_6H_5$, $-CH_2C_6H_4SO_3H$, etc.) and wherein said groups R, are substituents of an amino group attached to an aromatic nucleus which of itself may or may not contain other substituents.

The new dyes derived from this leucobase by oxidation form blue or green solutions which dye mordanted cotton and silk and other fibers, blue to green shades.

The following specific example will illustrate the invention, but it is understood that the invention is not limited thereto. The parts are by weight.

27 parts of ortho-xylylaldehyde, i. e., 3:4 di-methyl benzaldehyde, (obtainable for instance as described in my co-pending applications, Serial Nos. 514,903 and 516,124, filed November 14, 1921 and November 18, 1921, respectively,) 53 parts of dimethylaniline and 47 parts of concentrated hydrochloric acid of sp. gr.=1.20 are added to a flask equipped with a reflux condenser and heated at 100° C. for 24 hours, after which the mass is made faintly alkaline with sodium hydroxide, and steam distilled to remove any unchanged ortho-xylylaldehyde and dimethylaniline. The mass is then added to water and the leuco base which separates out is filtered off, washed and dried. The leuco base, as first formed, is a light brown viscous mass which on standing soon solidifies into a hard and more or less crystalline mass, which on crystallization from alcohol forms colorless needles which are rather insoluble in cold water but readily soluble in ether to a colorless solution. 50 parts of the dried leuco base are dissolved by the aid of heat in a mixture of 50 parts of hydrochloric acid, sp. gr. 1.15, 20 parts of glacial acetic acid and 40 parts of water. When solution is effected, it is diluted by the addition of 1250 parts of water, and to the well stirred solution there is slowly and uniformly added 37.5 parts of lead peroxide in the form of a 20% paste during a period of about one-half hour. After stirring the solution for an additional one-half hour, there is added a concentrated solution of sodium sulfate in an amount sufficient to precipitate the lead salts on lead sulfate, and the solution is finally filtered after standing two or three hours.

The dyestuff may be precipitated as the salt from the filtrate by the addition of common salt and zinc chloride thereto. It is, however, preferable to isolate it as the color base, which can be converted, if desired, into the hydrochloride, sulfate or other salts by the usual well known methods. For example, the filtrate is made slightly alkaline by the addition of caustic soda, whereby the color base is precipitated and filtered off. It may be purified, if desired, by dissolving it in petroleum ether, separating the insoluble matter and distilling off the solvent from the filtrate in a current of steam. By further purification by crystallization from ligroin it can be obtained in the form of lustrous plates, but this purification is usually unnecessary for the production of the salts used in dyeing operations. The oxalate can be prepared by dissolving the color base in about 3.5 parts of hot water which contains a proportion of 3 mols. of oxalic acid to 2 mols. of the color base and if necessary filtering the solution. From the filtrate, upon cooling, the dyestuff crystallizes out as the oxalate in the form of brilliant green crystals easily soluble in hot water to form a bluish green solution, but somewhat more difficultly in cold water and easily in alcohol. It dyes cotton mordanted with tannin and tartar emetic, unmordanted (and sometimes mordanted) silk, and unmordanted wool, as well as other fibers, bluish green shades which are somewhat bluer than those produced by malachite green.

Analogous leuco compounds and their corresponding oxidation products as dyestuffs may be produced by substituting in the above example for dimethylaniline the equivalent quantity of other substituted amines, e. g., diethylaniline, ethyl benzylaniline, ethylbenzylaniline sulfonic acid, monomethyl-o-toluidine, diethyl-o-toluidine and the like, or a mixture of equivalent quantities of various aromatic amines may be used. In carrying out the condensation to produce the leuco compound, other condensation reagents than hydrochloric acid can be used, for example, sulfuric acid, zinc chloride, etc.

Thus, by starting out with ortho-xylylaldehyde I have been able to obtain triphenylmethane dyestuffs under which term I included the salts of the dye as well as the dye itself, which dye wool, silk and mordanted cotton, desirable greenish blue shades which are characterized by their fastness to light and washing.

It may be pointed out that the dyestuffs derived by the oxidation of the leuco condensation products produced by the condensation of ortho-xylylaldehyde with aromatic secondary or tertiary amines, or both, containing acid substituents, for example, such groups as —SO$_2$OH—COOH, etc., are usually characterized as acid dyestuffs in contradistinction to analogous dyestuffs which do not contain such acid substituents and which are often characterized as basic dyestuffs. It is understood that both classes i. e., the acid and the basic dyestuffs and which are obtainable from ortho-xylylaldehyde are included within the scope of the present invention.

In the claims it will be understood that the term "univalent substituents" includes univalent substituents which are like or different and comprises hydrogen and alkyl, aryl, aralkyl or alkaryl groups which may or may not be substituted, such as, for example, —CH$_3$,—C$_2$H$_5$,—C$_6$H$_5$,—C$_6$H$_4$CH$_3$, —CH$_2$C$_6$H$_5$,—CH$_2$C$_6$H$_4$SO$_3$H, etc., that the term "benzene nucleus" includes benzene nuclei which may or may not otherwise obtain substituents, such as methyl, hologen, hydroxyl, sulphonic acid groups, and that the term "dyestuff" or "dyestuffs" includes both the base and salts of the base.

I claim:—

1. As new products, the dyestuffs derived, by oxidation and separation, from leuco compounds having the probable general formula:

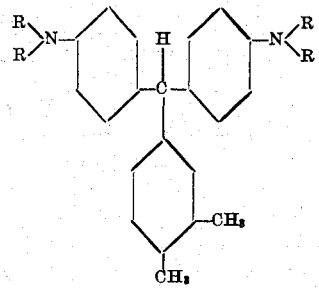

wherein R denotes univalent substituents in an amino group which is attached to a benzene nucleus, said leuco compounds being obtainable by condensing one mol. of ortho-xylylaldehyde with two mols. of N-substituted aromatic amines of the benzene series, and said dyestuffs dyeing mordanted cotton, mordanted and unmordanted silk and wool, and other materials, blue to green shades.

2. As a new product, the leuco compound of the triphenylmethane series obtainable by condensing one mol. of ortho-xylylaldehyde with two mols. of dimethylaniline and having the following probable formula.

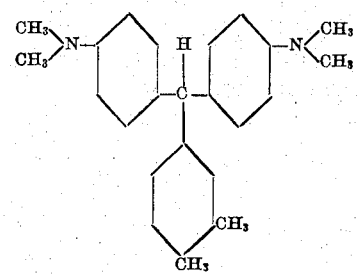

3. As a new product, the dyestuff derived from the leuco compound of claim 2, by oxidation and separation, and which dyes cotton mordanted with tannin and tartar emetic, and unmordanted silk, blue to bluish green shades.

4. Materials dyed with the new dyestuffs of claim 1.

5. Material dyed with the new dyestuff of claim 3.

In testimony whereof I affix my signature.

AUGUSTUS EDWARD CRAVER.